US012793656B2

(12) United States Patent
Park

(10) Patent No.: US 12,793,656 B2
(45) Date of Patent: Nov. 10, 2026

(54) DATA DRIVING CIRCUIT AND DISPLAY DEVICE INCLUDING THE SAME

(71) Applicant: LG Display Co., Ltd., Seoul (KR)

(72) Inventor: Man Gyu Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/193,199

(22) Filed: Apr. 29, 2025

(65) Prior Publication Data

US 2026/0179572 A1 Jun. 25, 2026

(30) Foreign Application Priority Data

Dec. 23, 2024 (KR) ........................ 10-2024-0193536

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2310/027* (2013.01); *G09G 2310/0294* (2013.01); *G09G 2310/0297* (2013.01); *G09G 2370/045* (2013.01)

(58) Field of Classification Search
CPC .. G09G 3/3291; G09G 3/32; G09G 2310/027; G09G 2310/0294; G09G 2310/0297; G09G 2370/045
See application file for complete search history.

(56) References Cited

U.S. PATENT DOCUMENTS 9,076,387 B1 * 7/2015 Lee .......................... G09G 3/20
2016/0189622 A1 * 6/2016 Lee ...................... G09G 3/3258 345/212
2019/0027095 A1 1/2019 Kim

FOREIGN PATENT DOCUMENTS

KR 10-2016-0007833 A 1/2016
KR 10-2019-0011150 A 2/2019

* cited by examiner

*Primary Examiner* — Matthew A Eason
*Assistant Examiner* — Chayce R Bibbee
(74) *Attorney, Agent, or Firm* — Seed Intellectual Property Law Group LLP

(57) ABSTRACT

A gate driving circuit and a display device including the same are disclosed. The data driving circuit includes a data channel configured to convert pixel data into a data voltage using a digital-to-analog converter to output the data voltage; and a sensing channel configured to sample a constant voltage, downscale the sampled voltage to reduce the voltage, and convert the downscaled voltage into digital data using an analog-to-digital converter to output the digital data.

17 Claims, 12 Drawing Sheets

DATA DRIVING CIRCUIT AND DISPLAY DEVICE INCLUDING THE SAME

CROSS-REFERENCE TO RELATED APPLICATION

This application claims priority to and the benefit of Korean Patent Application No. 10-2024-0193536, filed Dec. 23, 2024, the disclosure of which is incorporated herein by reference in its entirety.

BACKGROUND

Technical Field

The present disclosure relates to a data driving circuit and a display device including the same.

Description of Related Art

Electroluminescent display devices may include inorganic light-emitting display devices and organic light-emitting display devices according to the materials of a light emission layer. Since these electroluminescent display devices reproduce the input image using light-emitting elements placed in each pixel that emit light according to pixel data, they do not require a separate light source such as a backlight unit, have a fast response speed, and have excellent emission efficiency, luminance, and viewing angle.

As an example of electroluminescent display devices, organic light-emitting diode (OLED) displays are expanding their market thanks to the development of process technology and image quality improvement technology. Each pixel of an OLED display may include an OLED used as a light-emitting element and a driving transistor to drive the OLED. The electrical characteristics of the OLED and the driving transistor may vary between pixels due to their process variations, and may deteriorate due to the stress accumulated as the driving time elapses. To reduce the electrical characteristics deviation and deterioration due to time-dependent changes of the OLED and/or the driving transistor, internal compensation circuits and external compensation circuits may be applied to the driving circuit of the OLED display.

An external compensation circuit may determine deviations or changes in the electrical characteristics of the pixels based on the voltage or current sensed from the pixels through the sensing channel of the drive IC (integrated circuit) in which the data driving circuit of the display device is integrated. The voltage or current sensed from the pixels is sampled through a sample and hold circuit and then converted into digital data by an analog-to-digital converter (ADC). The external compensation circuit may select a compensation value based on the digital data sensed from the pixels, and modulate the pixel data of the input image with the selected compensation value to compensate for the deviations or changes in the electrical characteristics of the pixels.

Each drive IC chip has electrical characteristics of an ADC, such as offset deviation, and an offset of the ADC may change according to temperature. For example, as the temperature of the drive IC increases, the offset of the ADC may decrease, resulting in a decrease in the output data values of the ADC. This offset deviation of the ADC may cause significant errors in the sensing values that sense the electrical characteristics of the pixels, resulting in luminance differences between the pixel areas covered by the drive ICs.

BRIEF SUMMARY

The present disclosure provides a data driving circuit capable of compensating an offset of an ADC, and a display device including the same.

The technical features and characteristics of the present disclosure are not limited to those mentioned herein, and other features and characteristics not mentioned will be clearly understood by those skilled in the art from the description herein.

A data driving circuit according to one embodiment of the present disclosure includes: a data channel configured to convert pixel data into a data voltage using a digital-to-analog converter to output the data voltage; and a sensing channel configured to sample a constant voltage, downscale the sampled voltage to reduce the voltage, and convert the downscaled voltage into digital data using an analog-to-digital converter to output the digital data. In the sensing channel, the number of digital conversions performed by the analog-to-digital converter is greater than the number of samplings.

The sensing channel may sample the constant voltage once, downscale the sampled voltage once, and then digitally convert the sampled voltage N times, where N is a natural number greater than or equal to 2, during a preset unit sensing time.

The sensing channel may include: a reference voltage generator configured to generate a first reference voltage; a sampling circuit configured to sample and downscale the constant voltage; a multiplexer connected to the output side of the sampling circuit; an amplifier to which the first reference voltage is input and which is connected between the output side of the multiplexer and the input side of an analog-to-digital converter; a parallel-to-serial converter configured to convert the digital data output from the analog-to-digital converter into serial data; and a data transmitter configured to transmit the digital data output from the parallel-to-serial converter to the outside.

The data transmitter may add the digital data input from the analog-to-digital converter sequentially N times, where N is a natural number greater than or equal to 2, during a preset unit sensing time, and to transmit the added data together with a clock in series to the outside.

The multiplexer may supply the downscaled voltage to the analog-to-digital converter during the unit sensing time.

The sensing channel may further include: a synchronization circuit configured to stop driving the sampling circuit, the amplifier, and the analog-to-digital converter during a display period in which the data channel is driven, and to drive the sampling circuit, the amplifier, and the analog-to-digital converter during a sensing period in which the sensing channel is driven.

The sampling circuit may include: a first capacitor connected between a first node and a second node; a second capacitor connected between a third node and a fourth node; a first switch element connected between the fourth node and the input side of the multiplexer; a second switch element connected between the second reference voltage node and the second node; a third switch element connected between the constant voltage wire, to which the constant voltage is applied, and the first node; a fourth switch element connected between the second node and the fourth node; and a fifth switch element connected between the first node and the third node. The first reference voltage may be applied to the fourth node. A second reference voltage may be applied to the second reference voltage node. The first capacitor and the second capacitor may have different capacitances.

The switch elements may be turned on in the order of the first switch element, the second switch element, the third switch element, the fourth switch element, and the fifth switch element.

The capacitance of the second capacitor may be greater than the capacitance of the first capacitor. The second reference voltage may be greater than the first reference voltage.

The sensing channel may sample and average the constant voltage once, downscale the averaged voltage once, and digitally convert it N times, wherein N is a natural number greater than or equal to 2, during a preset unit sensing time.

The sampling circuit may include: a first sampling circuit configured to sample and downscale the constant voltage; a second sampling circuit configured to sample the constant voltage; and an averaging circuit configured to average the voltage sampled by the first sampling circuit and the voltage sampled by the second sampling circuit.

Each of the first sampling circuit and the second sampling circuit may include: a first capacitor connected between a first node and a second node; and a third switch element connected between a constant voltage wire, to which the constant voltage is applied, and the first node. The first sampling circuit may further include: a second capacitor connected between a third node and a fourth node; a first switch element connected between the fourth node and the input side of the multiplexer; a second switch element connected between the second reference voltage node and the second node; a fourth switch element connected between the second node and the fourth node; and a fifth switch element connected between the first node and the third node. The first reference voltage may be applied to the fourth node. A second reference voltage may be applied to the second reference voltage node.

The capacitance of the second capacitor may be greater than the capacitance of the first capacitor. The second reference voltage may be greater than the first reference voltage. The switch elements may be turned on in the order of the first switch element, the second switch element, the third switch element, the fourth switch element, and the fifth switch element.

The averaging circuit may include a charge-sharing switch element connected between a first node of the first sampling circuit and a second node of the first sampling circuit. The charge-sharing switch element may be turned on after the third switch element is turned off to connect the first capacitor of the first sampling circuit and the first capacitor of the second sampling circuit to each other, and then turned off before the fourth switch element is turned on to electrically disconnect the first capacitor of the second sampling circuit from the first capacitor of the first sampling circuit.

A display device according to one embodiment of the present disclosure includes: a display panel in which a plurality of data lines, a plurality of gate lines, a plurality of sensing lines, and a plurality of pixels are arranged; a data driving circuit connected to the sensing lines and the data lines; and a timing controller configured to transmit pixel data of an input image to the data driving circuit, and to receive ADC offset data from the data driving circuit. The data driving circuit includes: a data channel configured to convert pixel data into a data voltage using a digital-to-analog converter to output the data voltage; and a sensing channel configured to sample a constant voltage, downscale the sampled voltage to reduce the voltage, and convert the downscaled voltage to digital data using an analog-to-digital converter to output the ADC offset data.

The present disclosure may extend the life of the display panel and reduce the power consumption and heat generation of the drive IC by compensating for the deterioration of the pixels, as well as improve the image quality by reducing the ADC offset error during sensing intended to compensate for the deterioration of the pixels.

The present disclosure may reduce the circuit size of the sample-and-downscaling circuit in the sensing channel of the drive IC, and may accurately compensate the ADC offset error by sequentially outputting the ADC converted data N times and compensating the ADC offset with the average value thereof.

The effects of the present disclosure are not limited to the above-mentioned effects, and other effects that are not mentioned will be apparently understood by those skilled in the art from the following description and the appended claims.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
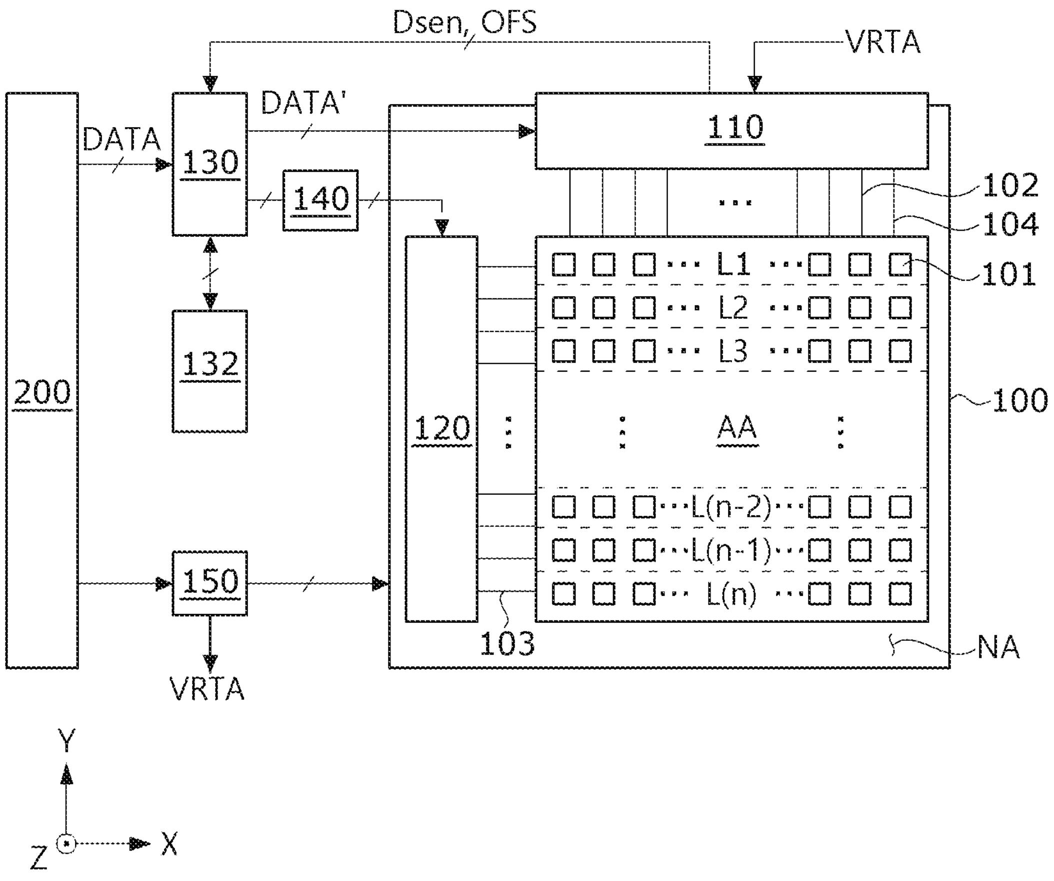
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present disclosure. Further, in describing the present disclosure, detailed descriptions of known related technologies may be omitted to avoid unnecessarily obscuring the subject matter of the present disclosure.

The terms such as "comprising," "including," "having," and "containing" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

FIG. 1 is a block diagram illustrating a display device according to one embodiment of the present disclosure.

Referring to FIG. 1, the display device according to an embodiment of the present disclosure includes a display panel 100 and a display panel driving circuit for writing pixel data to pixels of the display panel 100.

The display panel 100 may be a panel having a rectangular structure with a length (or width) in the X-axis direction, a length in the Y-axis direction, and a thickness in the Z-axis direction. The X-axis direction may be either a first direction or a left and right direction. The Y-axis direction may be a second direction intersecting the first direction, or an up and down direction. A display area AA of the display panel 100 includes a pixel array for displaying an input image thereon. The pixel array includes a plurality of data lines 102, a plurality of gate lines 103 intersected with the data lines 102, a plurality of sensing lines 104, and pixels arranged in a matrix form. The display panel 100 may further include power lines commonly connected to the pixels. The power lines may be commonly connected to pixel circuits and supply a voltage for driving the pixels 101 to the pixels 101.

Each of the pixels 101 may be divided into a red (R) sub-pixel, a green (G) sub-pixel, and a blue (B) sub-pixel for color implementation. Each of the pixels may further include a white (W) sub-pixel. Light-emitting elements may be a light-emitting element, such as an organic light emitting diode (OLED) or a micro light-emitting diode (LED). In the following, a pixel may be interpreted as a sub-pixel. The pixel circuits may be implemented as a circuit shown in FIG. 2, but is not limited thereto.

The display array AA includes a plurality of pixel lines L1 to Ln. Each of the pixel lines L1 to L(n) includes 1 (one) line of sub-pixels arranged along the x-axis direction in the display area AA. The sub-pixels arranged on one pixel line may share a gate line 103. One horizontal period is a time obtained by dividing one frame period by the total number of the pixel lines L1 to L(n). The sub-pixels arranged along the Y-axis direction may share the data line 102 and the sensing line 104.

Touch sensors may be arranged on the display panel 100 to sense touch inputs. The touch sensors may be arranged as an on-cell type or an add-on type on the display panel 100 or implemented as in-cell type touch sensors embedded in the pixel array.

The data lines 102 are arranged in the form of long wires along the Y-axis direction of the display panel 100 and are electrically connected to data channels of a data driver 110. The sensing lines 104 are arranged on the display panel 100 in parallel with the data lines 102 and may connect the sub-pixels to second sensing channels of the data driver 110. The gate lines 103 are arranged in the form of long wires along the X-axis direction of the display panel 100 to intersect the data lines 102 and are electrically connected to output nodes (or terminals) of the gate driver 120.

The display panel driving circuit writes the pixel data of the input image to the pixels in the display panel 100 under the control of a timing controller 130. The display panel driving circuit includes the data driver 110 and the gate driver 120.

The data driver 110 may include a plurality of data channels and a plurality of sensing channels in which sensing circuits are arranged. The sensing channels include one or more first sensing channels that input a constant voltage VRTA to an analog-to-digital converter (ADC) to sense the ADC offset based on digital data output from the ADC, and one or more second sensing channels that are connected to the sensing lines 104 to sense electrical characteristics of one or more of the transistors and light-emitting elements of the sub-pixel. The constant voltage VRTA may be, but is not limited to, a constant voltage with a predetermined positive voltage, such as 4.5 [V]. The first sensing channel is not connected to the sensing line, but to the constant voltage wire (42 in FIG. 4) to which the constant voltage VRTA is applied.

The data channels of the data driver 110 are driven during an active period (or display period) every frame period and receive pixel data of the input image as a digital signal from the timing controller 130 to output a data voltage. The data voltage is supplied to the data lines 102. The data channels of the data driver converts pixel data DATA' of the input image into a gamma compensated voltage using a digital-to-analog converter (hereinafter referred to as "DAC") and output the data voltage of the pixel data. A gamma reference voltage is divided by a voltage divider circuit into a gamma compensated voltage for each grayscale. The gamma compensated voltage for each grayscale is provided to the DAC of the data driver 110. The data voltage is output through output buffers from the respective data channels of the data driver 110 and then supplied to the data lines 102.

The first sensing channel of the data driver 110 includes a sample and downscaling circuit, and a first ADC connected to the output side of the sample and downscaling circuit. Hereafter, the "sample and downscaling circuit" will be abbreviated as "sampling circuit". The sampling circuit samples a preset constant voltage, such as a constant voltage for offset sensing VRTA, and downscales the sampled voltage by a predetermined downscaling ratio for output. The voltage after downscaling is lower than the voltage before downscaling. The first ADC converts the downscaled voltage output from the sampling circuit into digital data and outputs ADC offset data OFS. The ADC offset data OFS is sent to the timing controller 130.

The second sensing channel of the data driver 110 includes a sample and hold circuit, and a second ADC connected to the output side of the sample and hold circuit. The sample and hold circuit samples the voltage or current received from the sub-pixel through the sense line 104 by applying it to a capacitor, and supplies the voltage charged in the capacitor to the second ADC. The second ADC converts the voltage input from the sample and hold circuit into digital data and outputs pixel sensing data Dsen. The pixel sensing data Dsen is sent to the timing controller 130. The sample and hold circuit and the second ADC of the second sensing channel may be implemented with circuits of substantially the same structure as the sampling circuit and the first ADC of the first sensing channel, but not limited thereto.

The gate driver 120 may be arranged in a non-display area NA on at least one of the right or left sides outside the display area AA in the display panel 100, or at least a portion thereof may be arranged within the display area AA. The gate driver 120 may be located in the non-display areas NA on opposite sides of the display panel with the display area AA of the display panel interposed therebetween, and may supply a pulse of the gate signal from the opposite sides of the gate lines 103 in a double feeding method. In another embodiment, the gate driver 120 may be located in at least one side of the left and right non-display areas of the display panel 100 to supply a gate signal to the gate lines 103 in a single feeding method. The gate driver 120 sequentially outputs pulses of the gate signals to the gate lines 103 under the control of the timing controller 130. The gate driver 120 may sequentially supply the pulses of the gate signals to the gate lines 103 by shifting the pulses of the gate signals using shift registers. The gate signals may include, but are not limited to, a first gate signal SCAN and a second gate signal SENSE shown in FIG. 3.

The host system 200 may scale an image signal from a video source to match the resolution of the display panel 100, and may transmit it to the timing controller 130 together with the timing control signal. The timing controller 130 receives digital video data of the input image and a timing signal synchronized with the digital video data from the host system 200. The timing signal may include a vertical synchronization signal Vsync, a horizontal synchronization signal Hsync, and a data enable signal DE. Since a vertical period and a horizontal period may be known by counting the data enable signal DE, the vertical synchronization signal Vsync and the horizontal synchronization signal Hsync may be omitted. The data enable signal DE provides the valid interval of pixel data, including the pulses that occur during the active period every frame period. A horizontal synchronization signal Hsync and the data enable signal DE have a period of one horizontal period (1H).

The timing controller 130 may control the operation timing of each of the data driver 110 and the gate driver 120 based on the timing signals Vsync, Hsync, and DE received from a host system 200. The first controller 130 generates a data timing control signal for controlling the operation timing of the data driver 110 and a gate timing control signal for controlling the operation timing of the gate driver 120. The timing controller 130 may be implemented as an application-specific integrated circuit (ASIC).

Figure 2:
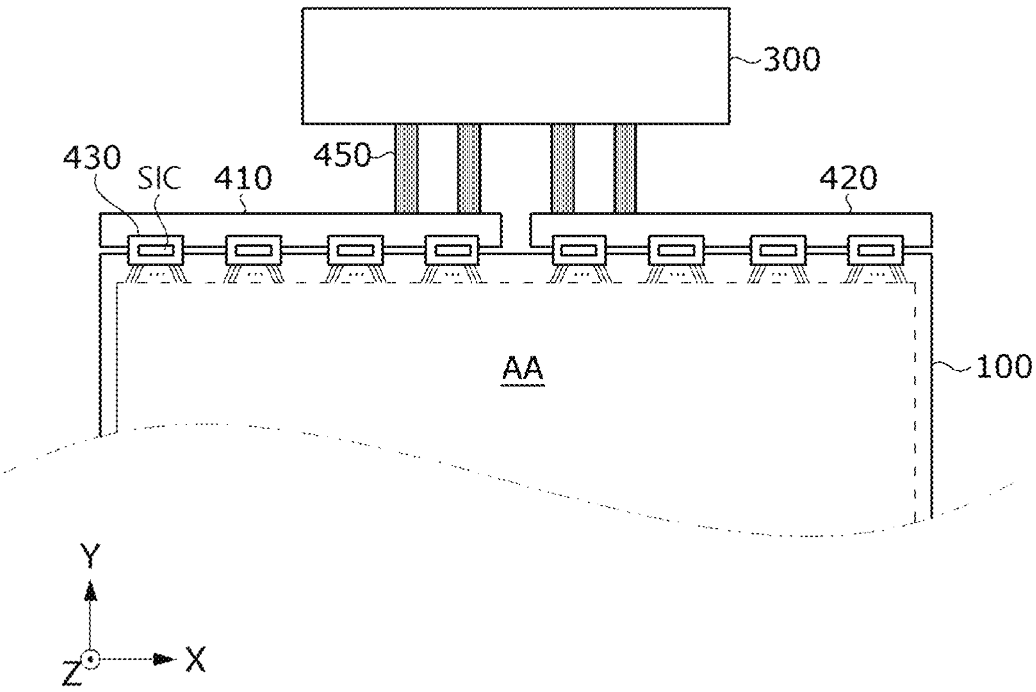
FIG. 2 is a diagram illustrating a connection structure of a display panel and a driving circuitry according to one embodiment of the present disclosure.

The timing controller 130 may be connected to a memory 132. The memory 132 may store setting values for driving parameters the display panel driving circuit, program codes executing an algorithm for improving image quality, compensation values selected according to the pixel sensing data Dsen, an ADC offset reference value set for each drive IC SIC shown in FIG. 2, and the like. The compensation value may include a gain, which is multiplied by the pixel data, and an offset, which is added to the pixel data. The compensation value may be set as look-up table data and stored in the memory 132. The circuit of the data driver 110 is integrated in the source drive IC SIC as shown in FIG. 2. The drive IC SIC may be interpreted as either a data drive IC or a source drive IC.

The memory 132 may include a non-volatile memory and a volatile memory. The non-volatile memory may include one or more of readable and writable memories, such as a NAND flash memory, a NOR flash memory, and an electrically erasable programmable read-only memory (EEPROM). The NAND flash memory may be of the single level cell (SLC) type. The volatile memory may include one or more of a dynamic RAM (DRAM), a static RAM (SRAM), a synchronous dynamic RAM (SDRAM), and a double data rate SDRAM (DDR SDRAM).

The timing controller 130 may incorporate the ADC offset data OFS input from the data driver 110 into the sensing data Dsen to compensate for an ADC offset error value in the sensing data Dsen. For example, but not limited to, the timing controller 130 may compensate for the ADC offset error value by subtracting the ADC offset data OFS from the pixel sensing data Dsen.

The timing controller 130 may input the sensing data Dsen into a lookup table to select a compensation value corresponding to the sensing data Dsen, and incorporate the compensation value into the pixel data of the input image, thereby modulating the pixel data. For example, but not limited to, the timing controller 130 may modulate the pixel data by adding or multiplying the pixel data with a compensation value to compensate for deviations and changes in electrical characteristics of the driving transistors and/or the OLED sensed for each sub-pixel. Pixel data DATA' modulated by the timing controller 130 is sent to the data driver 110, where it may be converted into a data voltage through the DAC and may then be applied to the data line 102.

The display panel driving circuit further includes a level shifter 140 and a power supply 150.

The level shifter 140 may convert the voltage level of an output signal, such as a gate timing control signal, of the timing controller 130. The level shifter 140 may perform level-shifting on the voltage of the input signal received from the timing controller 130, thereby outputting the output signal at a voltage higher than the input signal. For example, the input signal to the level shifter 150 may be a digital signal voltage level signal, and the output signal from the level shifter 150 may be an analog voltage signal that swings between a gate high voltage and a gate low voltage. The gate timing control signal output from the level shifter 140 may be input to the gate driver 120. The gate timing control signal may include a start pulse and clock. The gate timing control signal may further include a gate output enable signal.

The power supply 150 may include, but is not limited to, a charge pump, a regulator, a buck converter, a boost converter, and the like. The power supply 150 may receive a direct current input voltage from the host system 200 to generate the power to drive the display panel driving circuits 110 and 120 and the pixels 101. The power supply 150 may output a constant voltage (or DC voltage), such as the gamma reference voltage, the gate high voltage, the gate low voltage, or power for the pixel circuit. The gamma reference voltage (GMA in FIG. 4) may be supplied to the DAC of the data driver 110. The gate high voltage and the gate low voltage may be supplied to the level shifter 140 and the gate driver 120. Power for the pixel circuit may include, but is not limited to, a constant voltage VRTA, a pixel driving voltage (EVDD in FIG. 3), a pixel ground voltage (EVSS in FIG. 3), and a reference voltage (Vref in FIG. 3). The constant voltage VRTA is applied to the second sensing channel of the data driver 110. The power for the pixel circuit may be applied to the pixels through power lines commonly connected to the pixels. The power supply 150 may vary the level of the output voltage under the control of the timing controller 130. The power supply 150 may be implemented as a power management integrated circuit (PMIC), but is not limited thereto.

The display device of the present disclosure may determine the level of degradation of each of the sub-pixels by real-time sensing of the electrical characteristics of the driving transistors and/or the light-emitting elements, such as threshold voltage and mobility, at each of the sub-pixels during the sensing period. The sensing period may include a power-on sequence when the display device starts up, a power-off sequence when the display device turns off, and a real-time sensing period that is set during image display on the display panel 100. The real-time sensing period may be set during a vertical blank interval in which there is no pixel data every frame period.

The first and second sensing channels of the data driver 110 may be driven during the sensing period. For example, but not limited to, the first sensing channel may be driven during the power-off sequence and/or the real-time sensing period to output the ADC offset data OFS. The second sensing channel may be driven during the power-on sequence, the power-off sequence, and the real-time sensing period to output the pixel sensing data Dsen.

FIG. 2 is a diagram illustrating a connection structure of a display panel and a driving circuitry according to one embodiment of the disclosure.

Referring to FIG. 2, source boards 410 and 420 may be electrically connected to the display panel 100. A control board 300 may be electrically connected to the source boards 410 and 420 through a flexible cable, for example, a flexible flat cable (FFC). The source boards 410 and 420 and the control board 300 may be implemented as a printed circuit board (PCB). The FFC may be connected to a connector mounted on each of the source boards 410 and 420 and the control board 300. The timing controller 130, the power supply 150, the volatile memory, and the like may be mounted on the control board 300. The level shifter 140 and the nonvolatile memory may be mounted on the control board 300 and/or the source boards 410 and 420.

The drive IC SIC may be mounted on a flexible film of a chip on film (COF) 430 and bonded to the pad area of the display panel 100 in a tape automated bonding (TAB) process so that it is electrically connected to the data lines 102 and sensing lines 104. In the TAB process, an anisotropic conductive film (ACF) is bonded to the pad area of the display panel 100, and the COF 430 is electrically connected and bonded to the display panel 100 at the same time using the ACF.

The temperature of the drive IC SIC is proportional to its power dissipation, thermal resistance coefficient, and the temperature of the surrounding environment. The characteristics of the pixel data of the input image affect the power consumed by the drive IC SIC, and the power consumed by the drive IC SIC causes the drive IC SIC to rise in temperature and generates heat. A thermal resistance coefficient indicates how quickly the drive IC SIC may dissipate heat to the outside. The thermal resistance coefficient is related to the heat dissipation path associated with the mechanical object that come into contact with the drive IC SIC.

Depending on the characteristics of the pixel data of the input image or the extent of contact between the drive IC SIC and the mechanical object providing the heat dissipation path, the temperature of the drive IC may vary, affecting the ADC's sensitivity to temperature and resulting in different ADC offsets for each signal IC. The ADC offset error for each drive IC may introduce an error in the sensing data Dsen in which the electrical characteristics of each sub-pixel are sensed, resulting in visible luminance differences between the pixel areas covered by the drive ICs.

To reduce the ADC offset error for each drive IC, the drive IC SIC of the embodiment provides a real-time ADC offset compensation (RTAOC) using the first sensing channel. The ADC offset varies with the temperature of the drive IC SIC. The ADC offset error sensed for each drive IC SIC means that there is a temperature difference of the drive IC SIC. The timing controller 130 may compensate for ADC offset errors, as well as changes and deterioration in the electrical characteristics of each sub-pixel, caused by temperature variations for each drive IC, by modulating the pixel data by incorporating the ADC offset data OFS from each drive IC into the sensing data Dsen.

The ADC offset reference values measured at room temperature for each drive IC are stored in non-volatile memory. As the temperature of the drive IC increases, the ADC offset may be lower than the reference value. The timing controller 130 may correct the ADC offset variation value based on the difference between the ADC offset reference value stored for each drive IC and the ADC offset data received through the first sensing channel of the drive IC SIC, and incorporate it into the pixel data.

Figure 3:
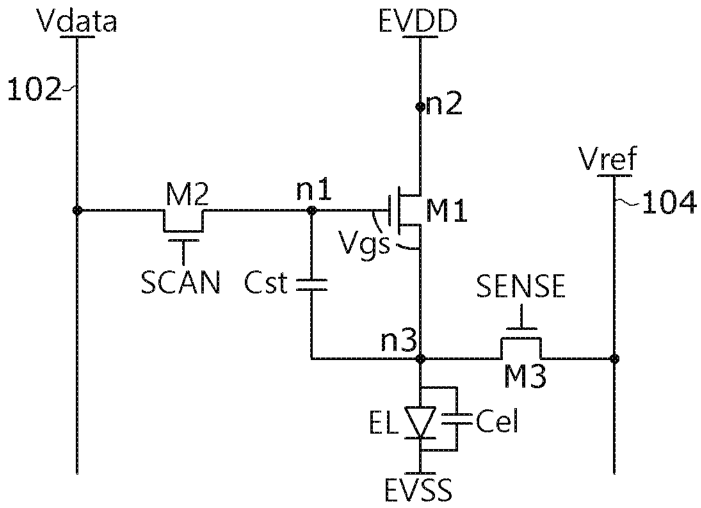
FIG. 3 is a circuit diagram illustrating a pixel circuit according to one embodiment of the present disclosure.

FIG. 3 is a circuit diagram illustrating a pixel circuit according to one embodiment of the present disclosure.

Referring to FIG. 3, the pixel circuit may include a light-emitting element EL, a driving transistor M1, a storage capacitor Cst, a first switch transistor M2, and a second switch transistor M3.

In FIG. 3, the pixel driving voltage EVDD may be 24V, and the pixel ground voltage EVSS may be 0V, but are not limited thereto. The dynamic range of the data voltage Vdata may be, but is not limited to, 2V to 10V. A voltage level of the data voltage Vdata is determined according to the pixel data value.

The light-emitting element EL includes an anode electrode, an emission layer, and a cathode electrode. The anode electrode of the light-emitting element EL may be connected to a third node n3. The pixel driving voltage EVSS may be applied to the cathode electrode of the light-emitting element EL. The light-emitting element EL may include a capacitance Cel between the anode electrode and the cathode electrode.

The driving transistor M1 generates current according to the gate-source voltage Vgs to drive the light-emitting element EL. The driving transistor M1 includes a gate electrode connected to a first node n1, a first electrode connected to a second node n2 to which the pixel drive voltage EVDD is applied, and a second electrode connected to the third node n3. The first electrode may be interpreted as the drain electrode and the second electrode as the source electrode. The storage capacitor Cst is connected between the first node n1 and the third node n3 to store the gate-source voltage Vgs of the driving transistor M1.

The first switch transistor M2 supplies the data voltage Vdata corresponding to a gray value of pixel data to the first node n1 in response to a pulse of a first gate signal SCAN. The first switch transistor M2 includes a first electrode connected to a data line 102 to which the data voltage Vdata is applied, a gate electrode to which the first gate signal SCAN is applied, and a second electrode connected to the first node n1.

The second switch transistor M3 connects the third node n3 to a sensing line 104 in response to a pulse of a second gate signal SENSE. The second switch transistor M3 includes a first electrode connected to the third node n3, a gate electrode to which the second gate signal SENSE is applied, and a second electrode connected to the sensing line 104. The reference voltage Vref may be applied to the sensing line 104.

The first and second switch transistors M2 and M3 may be implemented as n-type transistors or p-type transistors depending on their channel characteristics. The pulses of the gate signals SCAN and SENSE may be set as the gate-on voltage. The switch transistors M2 and M3 may be turned on in response to the gate-on voltage and turned off in response to the gate-off voltage. In the case of an n-channel transistor, the gate-on voltage may be a gate high voltage and the gate-off voltage may be a gate low voltage. In the case of a p-channel transistor, the gate-on voltage may be a gate low voltage and the gate-off voltage may be a gate high voltage.

The first gate signal SCAN and the second gate signal SENSE may be generated with different phases and/or pulse widths. In this case, the gate driver 120 may sequentially output the pulse of the first gate signal SCAN using a first shift register and the pulse of the second gate signal SENSE using a second shift register.

The first gate signal SCAN and the second gate signal SENSE may be the same gate signal. They may occur in different phases and/or pulse widths. In this case, the gate driver 120 may sequentially output the pulses of the first and second gate signals SCAN and SENSE using a single shift register, and thus the non-display area NA of the display panel 100 in which the gate driver 120 is arranged may be reduced and the gate line may be reduced to increase the aperture rate of the pixels.

Figure 4:
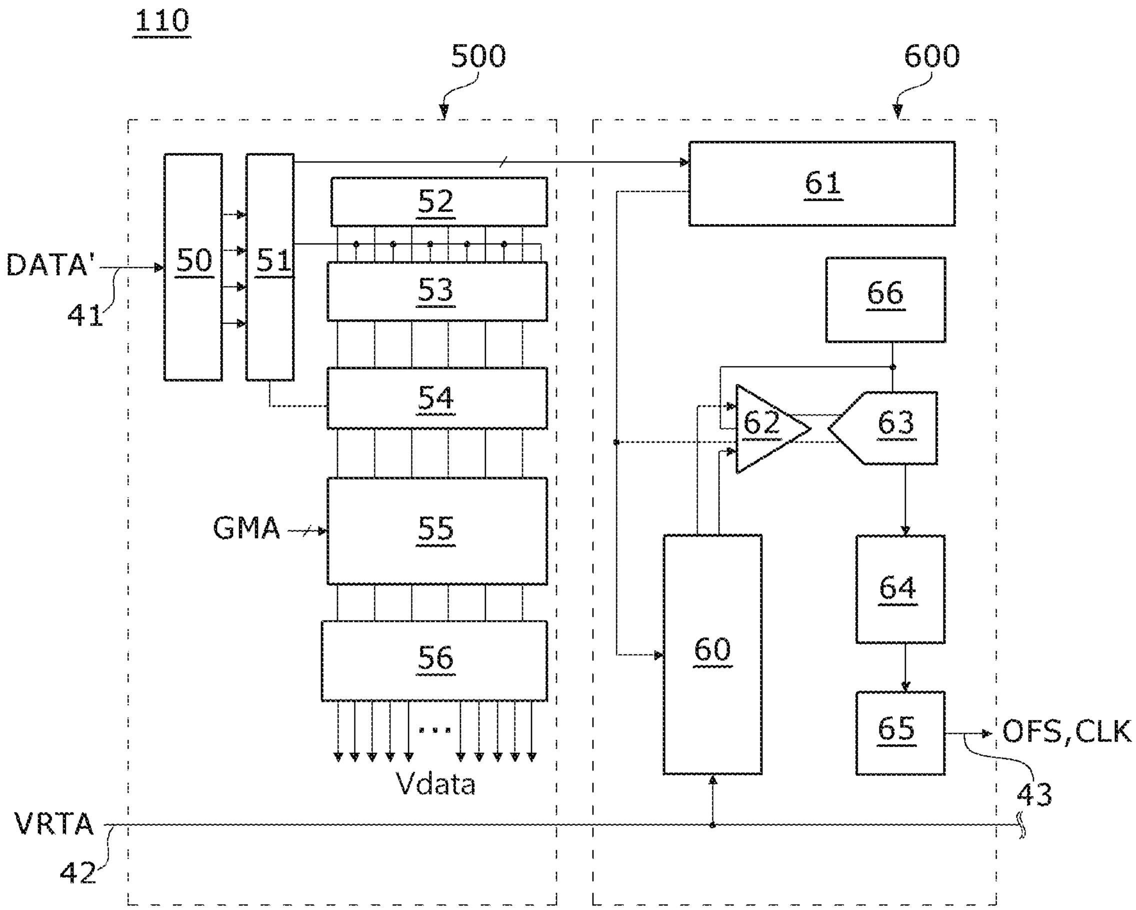
FIG. 4 is a diagram illustrating circuits of a data channel and a first sensing channel of the data driver.

FIG. 4 is a diagram illustrating circuits of a data channel and a first sensing channel of the data driver. In FIG. 4, the second sensing channel is omitted.

Referring to FIGS. 1 and 4, a data channel 500 may include a data receiver 50, a logic controller 51, a shift register 52, a first latch 53, a second latch 54, a DAC 55, and an output buffer 56.

The timing controller 130 may convert clock-embedded control data and pixel data into a differential signal and transmit the differential signal to the data channel 500 of the data driver 110 through a high-speed serial interface. The receiver 50 receives the data DATA' received in series from the timing controller 130 through a data signal wire 41. The receiver 50 restores the clock from the received data DATA', samples the control data and the pixel data using the restored clock, and provides them to the logic controller 51.

The logic controller 51 rearranges the pixel data supplied from the receiver 50 in units of sub-pixels. The logic controller 51 may supply a start pulse and a clock to the shift register 52 using the recovered clock and control data, and control the output timing of the first and second latches 53 and 54 and the output buffer 56. The logic controller 51 provides a synchronization signal to the synchronization circuit 61 using the recovered clock.

The shift register 52, the first latch 53, and the second latch 54 convert the pixel data in the serial system into data of parallel system. When the start pulse is input, the shift register 52 shifts the clock and outputs the shifted clock to the channels of the first latch 53. The first latch 53 latches the pixel data input from the receiver 50 through the logic controller 51 in response to the clock sequentially input from the shift register 52, and, after the pixel data is latched in all of its latch cells, simultaneously outputs the latched data to the latch cells of the second latch 54. The second latch 54 latches the pixel data simultaneously received from the first latch 53 and simultaneously outputs the latched pixel data to the DAC 55 in response to an output enable signal from the logic controller 51.

The gamma reference voltage GMA may be divided into grayscale voltages corresponding to the grayscale values of pixel data by a grayscale voltage division circuit including a series of resistors and may be supplied to the DAC 55. The DAC 55 selects a grayscale voltage corresponding to a gray value of pixel data input from the second latch 54 and outputs the selected grayscale voltage as the data voltage Vdata. The data voltage Vdata is output through the output buffer 56 and supplied to the data lines 102 of the display panel 100.

A first sensing channel 600 includes a synchronization circuit 61, a sampling circuit 60, a reference voltage generator 66, a global amplifier 62, an ADC 63, a parallel-to-serial converter 64, and a data transmitter 65. Each drive IC SIC may include, but is not limited to, N first sensing channels 600.

The synchronization circuit 61 may control the driving of the sampling circuit 60, the amplifier 62, and the ADC 63 in response to the synchronization signal input from the logic controller 51. The synchronization signals may have different logic values (or voltages) in the display period and the sensing period to distinguish between the display period and the sensing period. The synchronization circuit 61 may transmit the synchronization signal to the sampling circuit 60, the amplifier 62, and the ADC 63. The sampling circuit 60, the amplifier 62, and the ADC 63 may be enabled or disabled according to the voltage of the synchronization signal. For example, the synchronization circuit 61 may stop driving the sampling circuit 60, the amplifier 62, and the ADC 63 during the display periods in which the circuits of the data channel 500 are driven by using the synchronization signal, thereby reducing unnecessary power consumption and heat generation thereof. The synchronization circuit 61 drives the sampling circuit 60, the amplifier 62, and the ADC 63 during the sensing periods to output the ADC offset data.

The reference voltage generator 66 outputs the reference voltage for the ADC 63. The reference voltage generator 66 may be implemented as a voltage band gap reference (VBGR) circuit. The VBGR circuit may output a stable reference voltage that is not affected by changes in temperature and power supply voltage. A range of the input voltage of the ADC 63 is determined based on the reference voltage.

The amplifier 62 receives the reference voltage and suppresses the change in the input voltage of the ADC 63 while the ADC 63 is operating.

The sampling circuit 60 is connected between the constant voltage wire 42 and the amplifier 62. The sampling circuit 60 samples the constant voltage for offset sensing VRTA applied to the constant voltage wire 42 at a preset time point, stores it in a capacitor, and reduces the voltage charged in the capacitor by a preset ratio, for example, a ratio of 3:1. The sampled and downscaled voltage by the sampling circuit 60 is input to the ADC 63 through the amplifier 62. The ADC 63 converts the input voltage into digital data to output the ADC offset data OFS. The parallel-to-serial converter 64 converts the ADC offset data OFS into serial data. The data transmitter 65 may add the ADC offset data OFS sequentially input N times (where N is a natural number greater than or equal to 2) during a preset unit sensing time, and transmit the resulting sum to the timing controller 130 in series together with the clock CLK through one data signal wire 43. Here, the unit sensing time may be set to approximately 48 [μs] or more within the sensing period, but is not limited thereto. If the unit sensing time is insufficient, sensing errors may occur. If the sensing time is too long, the compensation tact time may increase. The timing controller 130 may calculate the average of the sum of the ADC offset data OFS input during a cycle of the unit sensing time by dividing the sum N and incorporate it into the sensing data Dsen.

Figure 5:
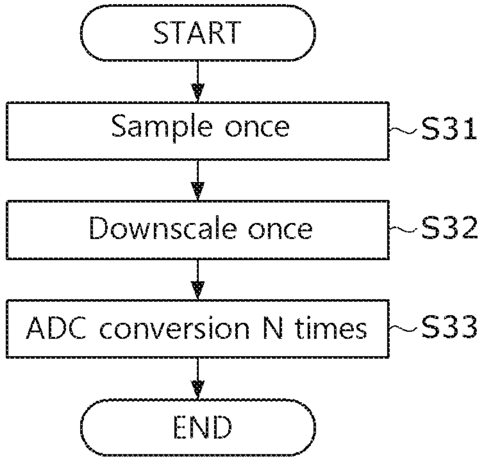
FIG. 5 is a flowchart illustrating a method of sensing an ADC offset according to one embodiment of the present disclosure.
Figure 6:
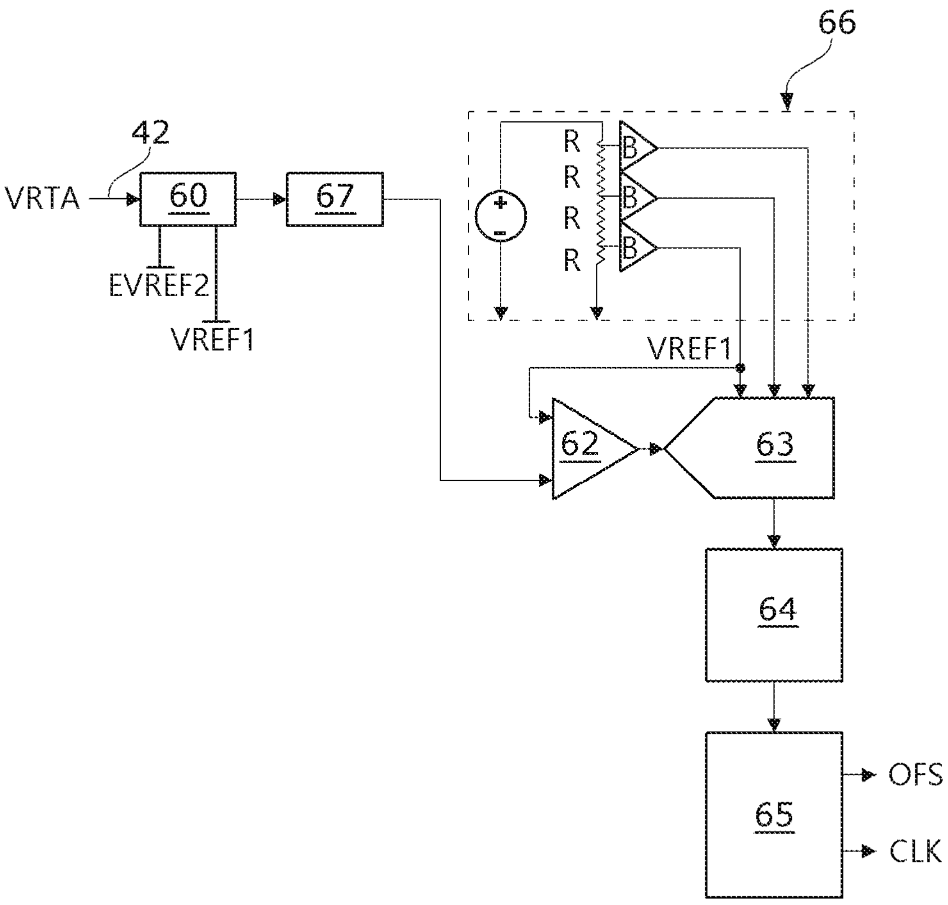
FIG. 6 is a block diagram illustrating one example of a first sensing channel that is applicable to the method of sensing an ADC offset shown in FIG. 5.

FIG. 5 is a flowchart illustrating a method of sensing an ADC offset according to one embodiment of the present disclosure. FIG. 6 is a block diagram illustrating one example of a first sensing channel applicable to the method of sensing an ADC offset shown in FIG. 5.

Referring to FIGS. 5 and 6, the sampling circuit 60 samples the constant voltage for offset sensing VRTA once, downscales it once, and outputs a voltage with a lowered voltage level (S31 and S32).

The ADC 63 converts the voltage input through the amplifier 62 into the digital data during the preset unit sensing time and outputs the ADC offset data OFS. The ADC 63 may convert the input voltage into the digital data N times during the unit sensing time (S33).

Figure 9:
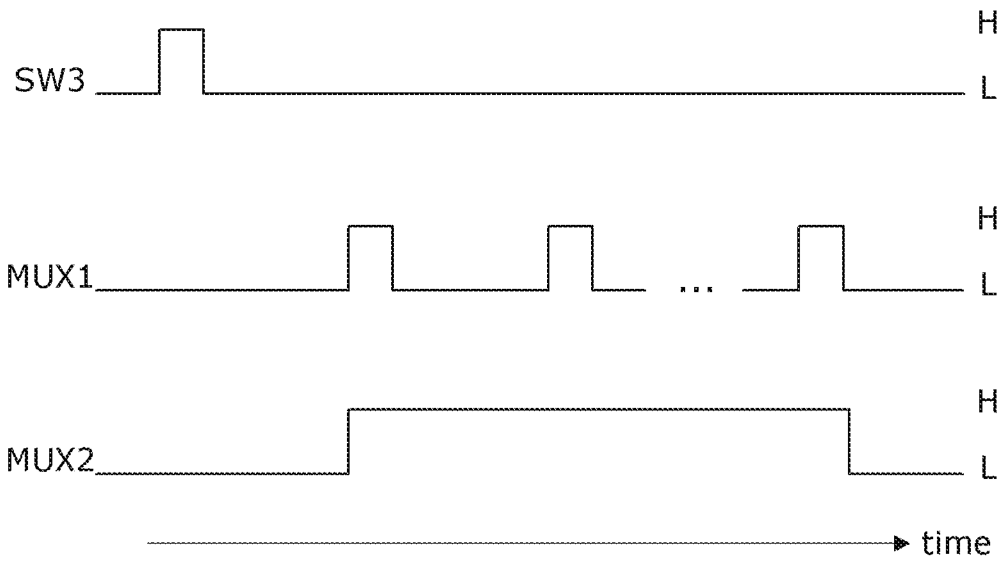
FIG. 9 is a waveform diagram illustrating control signals for the multiplexer shown in FIG. 6.

The first sensing channel further includes a multiplexer 67 connected between the sampling circuit 60 and the amplifier 62. The multiplexer 67 transfers the voltage from the sampling circuit 60 to the amplifier 62 in response to the first voltage H of the MUX control signals MUX1 and MUX2 as shown in FIG. 9.

The VBGR circuit of the reference voltage generator 66 includes resistors R connected in series to the constant voltage source and buffers B and outputs a first reference voltage VREF1. The reference voltage generator 66 or the power supply 150 may output a second reference voltage EVREF2. The first reference voltage VREF1 may be input to the sampling circuit 60, the amplifier 62, and the ADC 63.

As can be seen in FIGS. 5 and 6, the number of digital conversions performed by the ADC may be greater than the number of samplings of the constant voltage in the first sensing channel. Since only one sampling circuit is included in the first sensing channel, the drive IC SIC may reduce the circuit size of the first sensing channel, and may accurately compensate for the ADC offset by sequentially outputting the ADC converted data N times and compensating the ADC offset with the average value of the ADC converted data.

Figure 7:
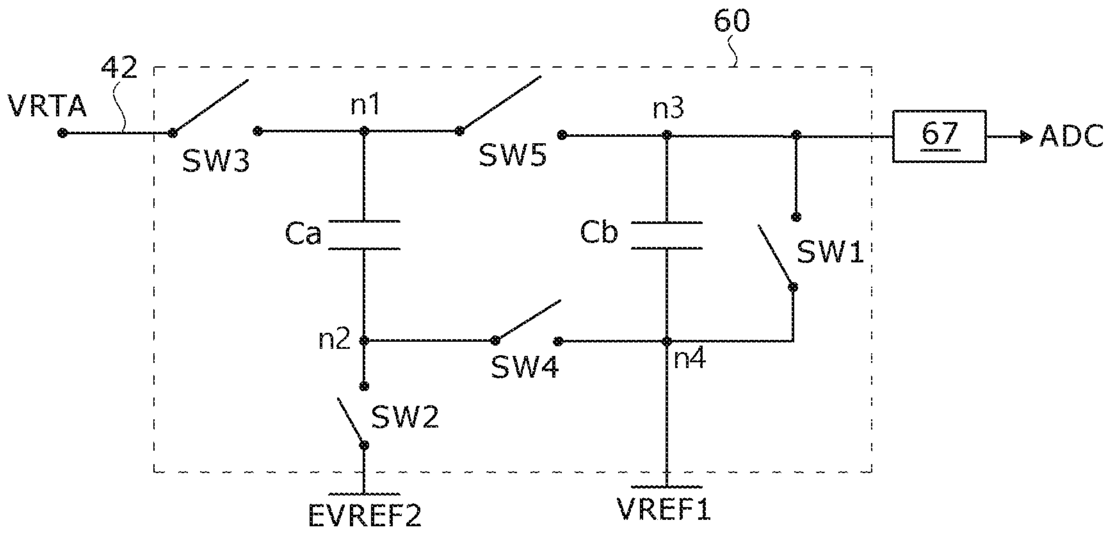
FIG. 7 is a circuit diagram illustrating the sampling circuit shown in FIG. 6 in detail.
Figure 8:
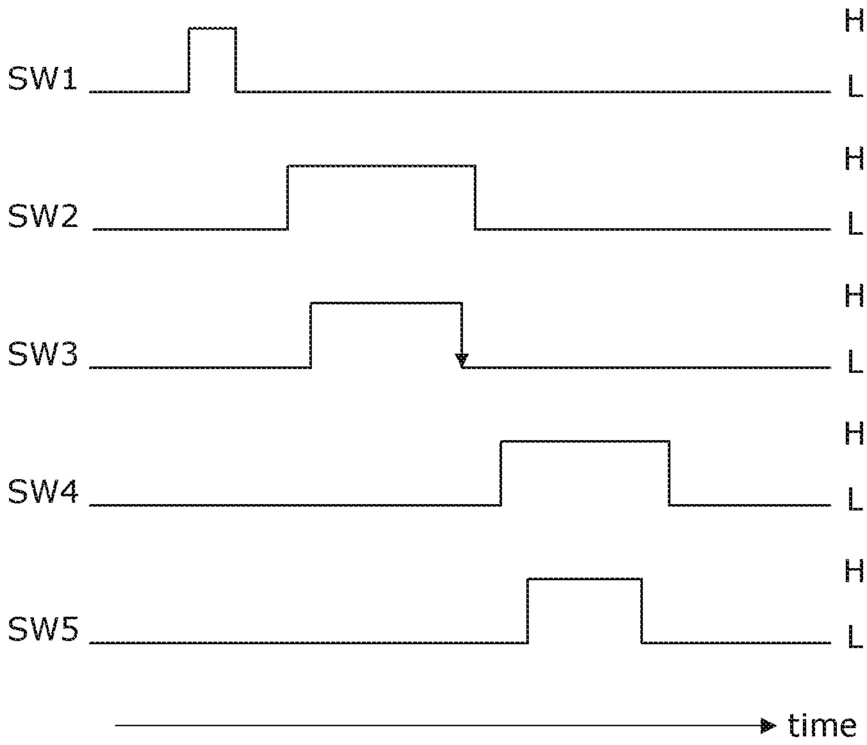
FIG. 8 is a waveform diagram illustrating control signals for the sampling circuit shown in FIG. 7.

FIG. 7 is a circuit diagram illustrating the sampling circuit 60 shown in FIG. 6 in detail. FIG. 8 is a waveform diagram illustrating control signals for the sampling circuit 60. The synchronization circuit 61 may generate the control signals for the sampling circuit 60 using the synchronization signal input from the logic controller 51.

Referring to FIGS. 7 and 8, the sampling circuit 60 includes first to fifth switch elements SW1 to SW5, and first and second capacitors Ca and Cb. The switch elements SW1 to SW5 may be implemented as a transistor. The switch elements SW1 to SW5 may be turned on in response to a first voltage H of the switch signals shown in FIG. 8, and turned off in response to a second voltage L. The switch elements SW1 to SW5 may be turned on in the order of SW1, SW2, SW3, SW4, and SW5, and turned off in the order of SW1, SW3, SW2, SW5, and SW4 in response to the switch signals shown in FIG. 8.

Figure 10:
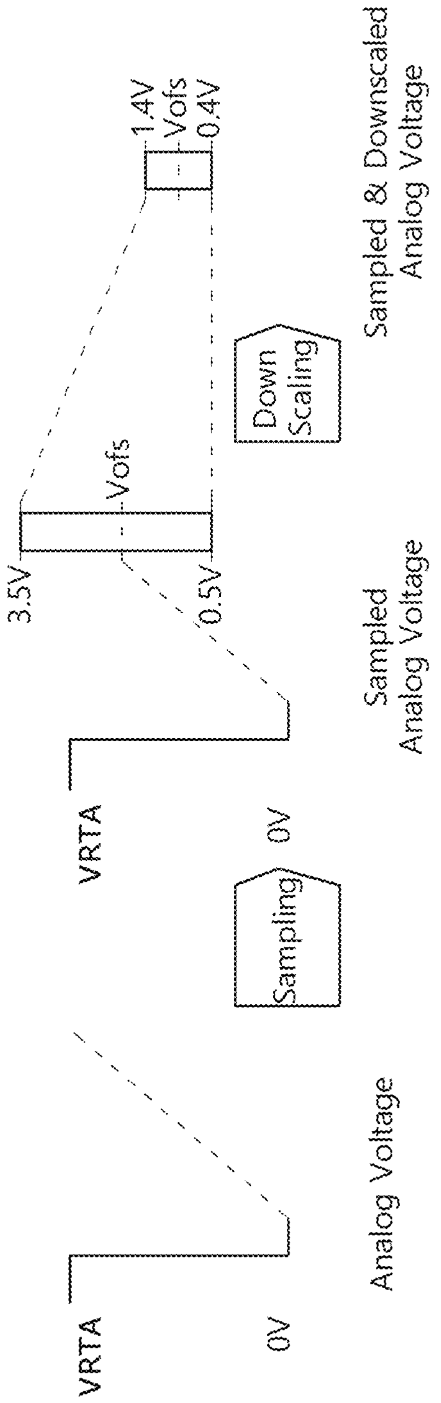
FIG. 10 is a diagram illustrating an example of the sampling and downscaling operation of the sampling circuit.

The first switch element SW1 is connected between a fourth node n4 and the input side of the multiplexer 67, and may be turned on in response to the first voltage H of a first switch signal. When the first switch element SW1 is turned on, the fourth node n4 may be electrically connected to the input side of the multiplexer 67 so that the second capacitor Cb is initialized. The second switch element SW2 is connected between a second node n2 and a second reference voltage node and may be turned on in response to the first voltage H of a second switch signal. The second reference voltage EVREF2 is applied to the second reference voltage node. The second reference voltage EVREF2 is applied to the second node n2 when the second switch element SW2 is turned on. The second reference voltage EVREF2 may be a higher voltage than a first reference voltage VREF1. For example, but not limited to, when the first reference voltage VREF1 is 0.4 [V], the second reference voltage EVREF2 may be 0.5 [V], as shown in FIG. 10.

The third switch element SW3 is connected between a constant voltage wire 42 and a first node n1 and may be turned on in response to the first voltage H of a third switch signal. A constant voltage for offset sensing VRTA is applied to the constant voltage wire 42. When both the second and third switch elements SW2 and SW3 are in the on-state, the constant voltage for offset sensing VRTA may be charged in a first capacitor Ca for sampling. The second and third switch elements SW2 and SW3 are turned off before the constant voltage for offset sensing VRTA is downscaled.

When the fourth and fifth switch elements SW4 and SW5 are turned on after the second switch element SW2 is turned off, downscaling of the voltage charged in the first capacitor Ca may begin. The fourth switch element SW4 is connected between the second node n2 and the fourth node n4, and may be turned on in response to the first voltage H of a fourth switch signal. When the fourth switch element SW4 is turned on, the second node n2 is electrically connected to the fourth node n4. The fifth switch element SW5 is connected between the first node n1 and a third node n3, and may be turned on in response to the first voltage H of a fifth switch signal. When the fifth switch element SW5 is turned on, the first node n1 is electrically connected to the third node n3.

The sampling circuit 60 may adjust the sampled voltage with a 3:1 downscaling. When the capacitance of the first capacitor Ca is C, the capacitance of the second capacitor Cb is 2C and the voltage of the first capacitor Ca is Va and the voltage of the second capacitor Cb is Vx, the amount of charge before and after downscaling may be determined as follows by applying the law of conservation of charge. $Q_{before}$ is the amount of charge before downscaling and $Q_{after}$ is the amount of charge after downscaling.

$$Q_{before} = C * Va$$

$$Q_{after} = 2C * Vx + C * Vx$$

where Vx is the voltage charged in the second capacitor after downscaling.

According to the law of conversion of charge, C*Va=2C*Vx+C*Vx, so Vx=⅓*Va.

FIG. 9 is a waveform diagram illustrating control signals for of the multiplexer shown in FIG. 6.

Referring to FIGS. 6 and 9, the MUX control signals MUX1 and MUX2 may include pulses of the first voltage H which occur successively N times, e.g., 16 times, during the unit sensing time, such as the first MUX control signal MUX1. The unit sensing time may be set to, but is not limited to, a unit sensing time of, for example, 48 [μs] or more. The multiplexer 67 may transmit the voltage downscaled by the sampling circuit 60 to the amplifier 62 in response to the first voltage H of the first MUX control signal MUX1 or the second MUX control signal MUX2. The first MUX signal MUX1 may include pulses of the first voltage (H), which occur consecutively N times, during the unit sensing time. The second MUX signal MUX2 may include a pulse that maintains the first voltage (H) during the unit sensing time.

Figure 11:
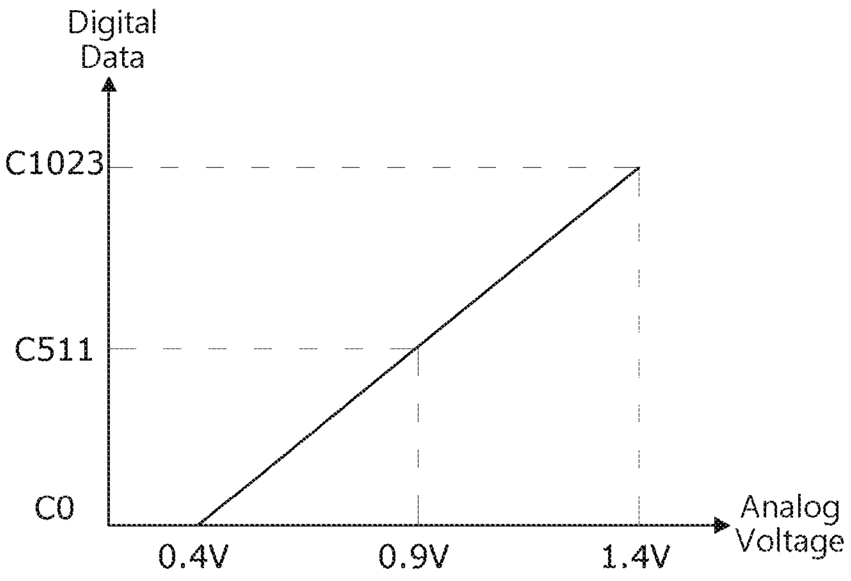
FIG. 11 is a diagram illustrating an example of the input voltage and output data to and from an ADC.

FIG. 10 is a diagram illustrating one example of the sampling and downscaling operation of the sampling circuit. In FIG. 10, 0.4 [V] denotes the first reference voltage VREF1 and 0.5 [V] denotes the second reference voltage EVREF2. FIG. 11 is a diagram showing one example of the input voltage and output data to and from the ADC. In the example of FIG. 10, the sampling circuit 60 samples the constant voltage for offset sensing VRTA within the 3 [V] voltage range between 0.5 [V] and 3.5 [V] into the first capacitor Ca, and then outputs an offset sensing voltage Vofs that has been downscaled from the sampled voltage to fit within the 1 [V] voltage range between 0.4 [V] and 1.4 [V]. The ADC 63 converts the offset sensing voltage Vofs input through the amplifier 62 into digital data and outputs the ADC offset data OFS. In FIG. 11, the abscissa is the analog voltage [V] input to the ADC 63, and the ordinate is the digital data converted by the ADC, i.e., the digital coded value of the ADC offset data OFS.

Figure 12:
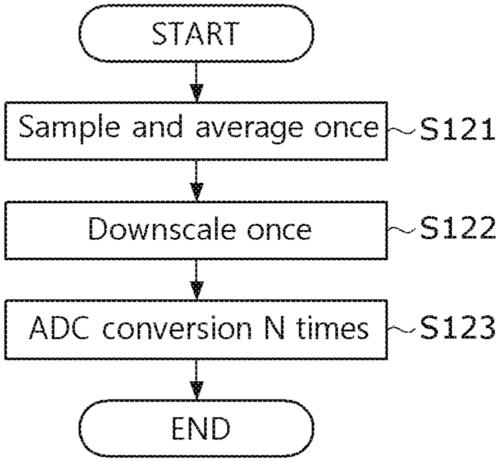
FIG. 12 is a flowchart illustrating a method of sensing an ADC offset according to another embodiment of the present disclosure.
Figure 13:
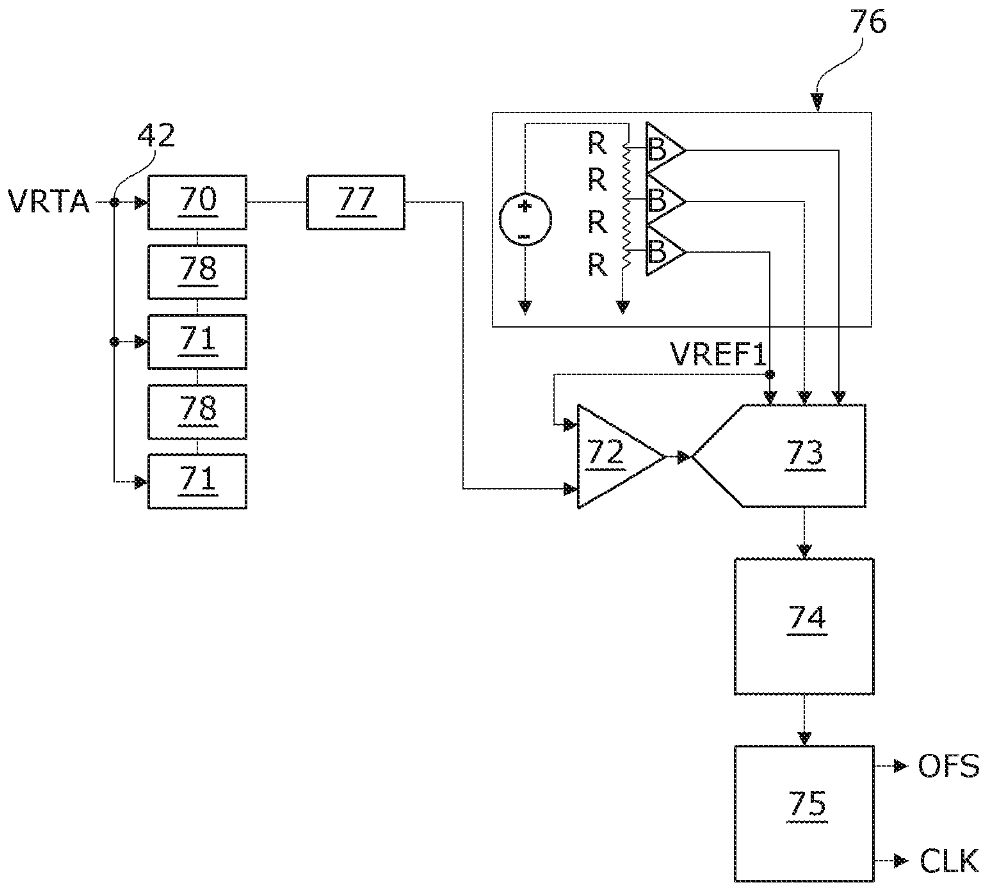
FIG. 13 is a block diagram illustrating one example of a first sensing channel that is applicable to the method of sensing an ADC offset shown in FIG. 12.

FIG. 12 is a flow diagram illustrating a method of sensing the ADC offset according to another embodiment of the present disclosure. FIG. 13 is a block diagram illustrating one example of a first sensing channel that is applicable to the method of sensing an ADC offset shown in FIG. 12. With respect to the first sensing channel shown in FIG. 13, any description that is redundant to the first sensing channel shown in FIG. 6 may be omitted.

Referring to FIGS. 12 and 13, sampling circuits 70 and 71 sample and average the constant voltage for offset sensing VRTA once, and output a voltage with a lowered voltage level by downscaling once (S121 and S122).

An ADC 73 converts the voltage input through the amplifier 72 into digital data during the unit sensing time and outputs the ADC offset data OFS. The ADC 73 may convert the input voltage into the digital data N times during the unit sensing time (S123).

The first sensing channel includes the sampling circuits 70 and 71, a multiplexer 77, an averaging circuit 78, a reference voltage generator 76, an amplifier 72, the ADC 73, a parallel-to-serial converter 74, and a data transmitter 75.

Figure 14:
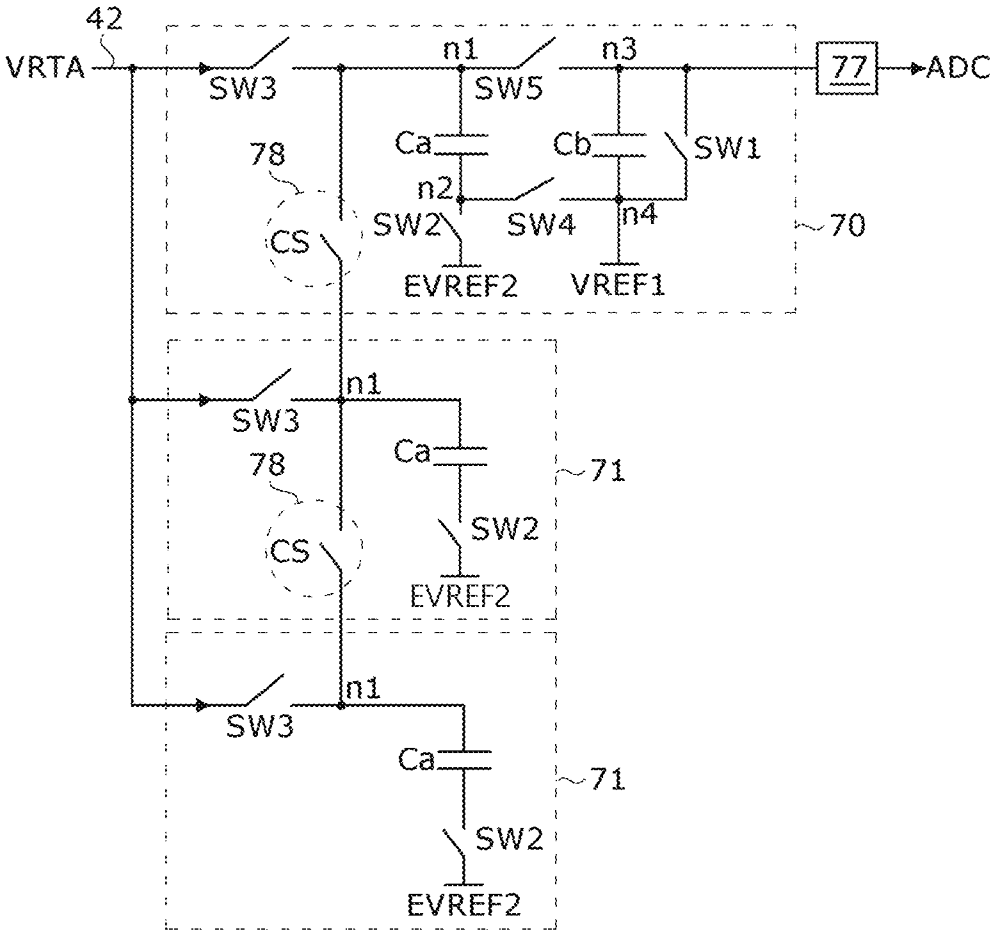
FIG. 14 is a circuit diagram illustrating the sampling circuits shown in FIG. 13 in detail.

The sampling circuits 70 and 71 include a first sampling circuit 70 for sampling a constant voltage for offset sensing VRTA and downscaling the averaged sampling voltage by the averaging circuit 78, and one or more second sampling circuits 71 for sampling the constant voltage for offset sensing VRTA. The second sampling circuit 71 has a smaller circuit size than the first sampling circuit 70 because it does not have a downscaling circuit, as shown in FIG. 14. The averaging circuit 78 averages the voltage sampled by the first sampling circuit 70 and the voltage sampled by the second sampling circuit 71.

As can be seen from FIGS. 12 and 13, in the first sensing channel, the circuit size of the first sensing channel may be reduced by using the sampling circuits and the averaging circuit, and the ADC offset error may be accurately compensated by outputting the ADC converted data N times sequentially and compensating the ADC offset with the average value.

Figure 15:
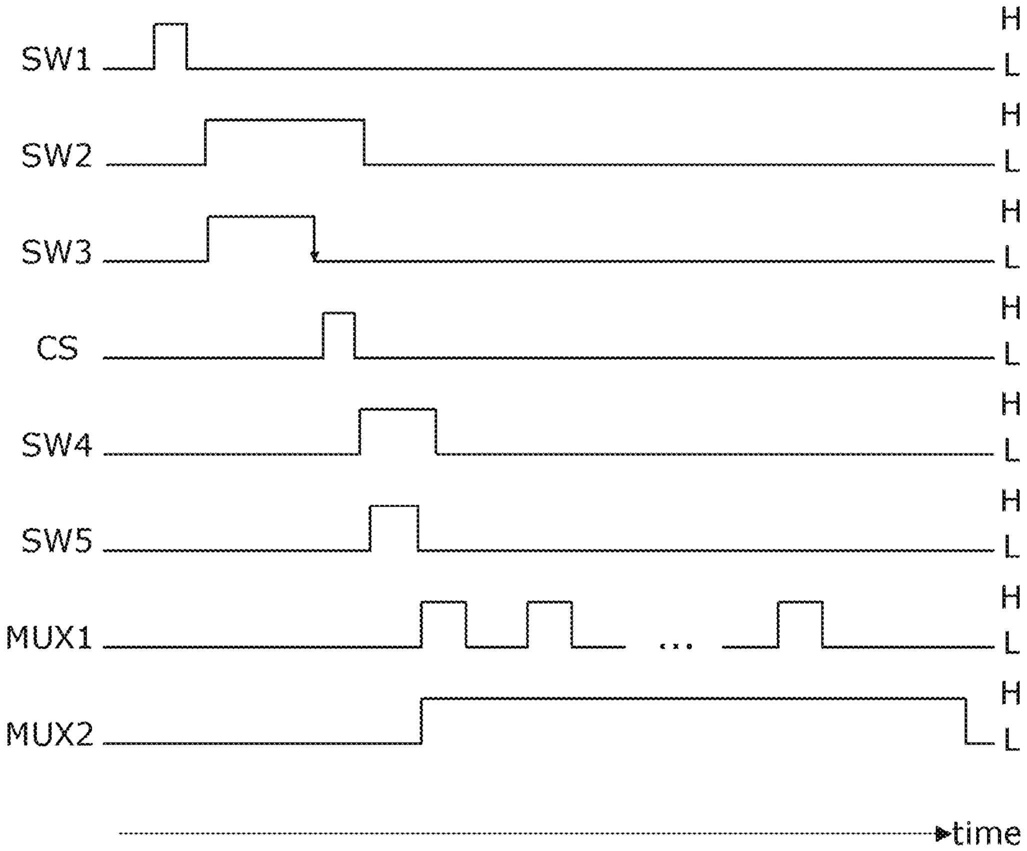
FIG. 15 is a waveform diagram illustrating the control signals for the sampling circuits shown in FIG. 13.

FIG. 14 is a circuit diagram illustrating the sampling circuits shown in FIG. 13 in detail. FIG. 15 is a waveform diagram illustrating the control signals for the sampling circuits shown in FIG. 13. With respect to the embodiments shown in FIGS. 14 and 15, descriptions that are redundant to the foregoing embodiments may be omitted.

Referring to FIGS. 14 and 15, the first sampling circuit 70 includes first to fifth switch elements SW1 to SW5, and first and second capacitors Ca and Cb. The switch elements SW1 to SW5 may be implemented as a transistor. The switch elements SW1 to SW5 may be turned on in the order of SW1, SW2, SW3, SW4, and SW5, and turned off in the order of SW1, SW3, SW2, SW5, and SW4, as shown in FIG. 15. The capacitance of the second capacitor Cb may be greater than the capacitance of the first capacitor Ca. The second reference voltage EVREF2 applied to the first capacitor Ca may be a higher voltage than the first reference voltage VREF1 applied to the second capacitor Cb.

The second sampling circuit 71 may be implemented with only the third switch element SW3 and the first capacitor Ca, since it has no downscaling circuit. In the first and second sampling circuits 70 and 71, the third switch elements SW3 are substantially the same because they are turned on and off simultaneously in response to the same switch signal, and the first capacitors Ca are also substantial the same.

The averaging circuit 78 includes a plurality of charge-sharing switch elements CS for connecting the first capacitors Ca of the sampling circuits 70 and 71.

The charge-sharing switch elements CS may be connected between the first capacitors Ca of the sampling circuits 70 and 71 and may be turned on in response to the first voltage H of a sixth switch signal, as shown in FIG. 15. The charge-sharing switch element CS is connected between the first node n1 of the first sampling circuit 70 and the first node n1 of the second sampling circuit 71, as shown in FIG. 14. The charge-sharing switch elements CS are turned on after the third switch elements SW3 are turned off to connect the first capacitors Ca to each other, and then turned off before the fourth switch element SW4 is turned on to electrically isolate the first capacitors Ca. When the charge-sharing switch element CS are turned on, the first capacitors Ca are short-circuited to each other so that the voltages sampled by the sampling circuits 70 and 71 are averaged. The first sampling circuit 70 downscales the averaged voltage and provides it to the multiplexer 77.

The multiplexer 77 transmits the output voltage of the first sampling circuit 70 to the amplifier 72 in response to the first voltage of the MUX control signals MUX1 and MUX2 shown in FIG. 15. The first MUX signal MUX1 may include pulses of the first voltage (H), which occur consecutively N times, during the unit sensing time. The second MUX signal MUX2 may include a pulse that maintains the first voltage (H) during the unit sensing time.

The display device according to an embodiment of the present disclosure may be applied to a mobile device, a video phone, a smart watch, a watch phone, a wearable apparatus, a foldable apparatus, a rollable apparatus, a bendable apparatus, a flexible apparatus, a curved apparatus, a sliding apparatus, a variable apparatus, an electronic notebook, an electronic book, a portable multimedia player (PMP), a personal digital assistant (PDA), an MP3 player, a mobile medical device, a desktop PC, a laptop PC, a netbook computer, a workstation, a navigation system, a vehicle display device, a theater display device, a television, a wallpaper device, a signage device, a game device, a notebook, a monitor, a camera, a camcorder, a home appliance, and the like. In addition, the display device according to one or more embodiments of the present disclosure may be applied to an organic light-emitting lighting device or an inorganic light-emitting lighting device.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data driving circuit comprising:

a data channel configured to convert pixel data into a data voltage using a digital-to-analog converter to output the data voltage; and a sensing channel configured to sample a voltage, downscale the sampled voltage to reduce voltage value, and convert the downscaled voltage into digital data using an analog-to-digital converter to output the digital data, wherein, in the sensing channel, a number of digital conversions performed by the analog-to-digital converter is greater than a number of samplings, wherein the sensing channel includes:

a reference voltage generator configured to generate a first reference voltage;

a sampling circuit configured to sample and downscale the voltage;

a multiplexer connected to an output side of the sampling circuit;

an amplifier configured to receive the first reference voltage and connected between an output side of the multiplexer and an input side of an analog-to-digital converter;

a parallel-to-serial converter configured to convert a digital data output from the analog-to-digital converter into serial data; and a data transmitter configured to transmit the digital data output from the parallel-to-serial converter to the outside.

2. The data driving circuit of claim 1, wherein the sensing channel is configured to sample the voltage once, downscale the sampled voltage once, and then digitally convert the sampled voltage N times, where N is a natural number greater than or equal to 2, during a unit sensing time.

3. The data driving circuit of claim 1, wherein the data transmitter is configured to add the digital data input from the analog-to-digital converter sequentially N times, where N is a natural number greater than or equal to 2, during a preset unit sensing time, and to transmit the added data together with a clock in series to the outside.

4. The data driving circuit of claim 3, the multiplexer is configured to supply the downscaled voltage to the analog-to-digital converter during the unit sensing time.

5. The data driving circuit of claim 1, wherein the sensing channel further includes:

a synchronization circuit configured to stop driving the sampling circuit, the amplifier, and the analog-to-digital converter during a display period in which the data channel is driven, and to drive the sampling circuit, the amplifier, and the analog-to-digital converter during a sensing period in which the sensing channel is driven.

6. The data driving circuit of claim 1, wherein the sampling circuit includes:

a first capacitor connected between a first node and a second node;

a second capacitor connected between a third node and a fourth node;

a first switch element connected between the fourth node and the input side of the multiplexer;

a second switch element connected between the second reference voltage node and the second node;

a third switch element connected between the constant voltage wire, to which the voltage is applied, and the first node;

a fourth switch element connected between the second node and the fourth node; and a fifth switch element connected between the first node and the third node, and wherein the first reference voltage is applied to the fourth node, a second reference voltage is applied to the second reference voltage node, and the first capacitor and the second capacitor have different capacitances.

7. The data driving circuit of claim 6, wherein the switch elements are configured to be turned on in the order of the first switch element, the second switch element, the third switch element, the fourth switch element, and the fifth switch element.

8. The data driving circuit of claim 6, wherein a capacitance of the second capacitor is greater than a capacitance of the first capacitor, and wherein the second reference voltage is greater than the first reference voltage.

9. The data driving circuit of claim 1, wherein the sensing channel is configured to sample and average the voltage once, downscale the averaged voltage once, and digitally convert it N times, wherein N is a natural number greater than or equal to 2, during a preset unit sensing time.

10. The data driving circuit of claim 9, wherein the sampling circuit includes:

a first sampling circuit configured to sample and downscale the voltage;

a second sampling circuit configured to sample the voltage; and an averaging circuit configured to average the voltage sampled by the first sampling circuit and the voltage sampled by the second sampling circuit.

11. The data driving circuit of claim 10, wherein each of the first sampling circuit and the second sampling circuit includes:

a first capacitor connected between a first node and a second node; and a third switch element connected between a constant voltage wire, to which the voltage is applied, and the first node, wherein the first sampling circuit further includes:

a second capacitor connected between a third node and a fourth node;

a first switch element connected between the fourth node and the input side of the multiplexer;

a second switch element connected between the second reference voltage node and the second node;

a fourth switch element connected between the second node and the fourth node; and a fifth switch element connected between the first node and the third node, and wherein the first reference voltage is applied to the fourth node, a second reference voltage is applied to the second reference voltage node.

12. The data driving circuit of claim 11, wherein the capacitance of the second capacitor is greater than the capacitance of the first capacitor, wherein the second reference voltage is greater than the first reference voltage, and wherein the switch elements are configured to be turned on in the order of the first switch element, the second switch element, the third switch element, the fourth switch element, and the fifth switch element.

13. The data driving circuit of claim 11, wherein a capacitance of the second capacitor is greater than a capacitance of the first capacitor, and wherein the second reference voltage is greater than the first reference voltage.

14. The data driving circuit of claim 11, wherein the averaging circuit includes:

a charge-sharing switch element connected between a first node of the first sampling circuit and a second node of the first sampling circuit, and wherein the charge-sharing switch element is turned on after the third switch element is turned off to connect the first capacitor of the first sampling circuit and the first capacitor of the second sampling circuit to each other, and then turned off before the fourth switch element is turned on to electrically disconnect the first capacitor of the second sampling circuit from the first capacitor of the first sampling circuit.

15. A display device comprising:

a display panel in which a plurality of data lines, a plurality of gate lines, a plurality of sensing lines, and a plurality of pixels are arranged;

a data driving circuit connected to the sensing lines and the data lines; and a timing controller configured to transmit pixel data of an input image to the data driving circuit, and to receive ADC offset data from the data driving circuit, wherein the data driving circuit includes:

a data channel configured to convert pixel data into a data voltage using a digital-to-analog converter to output the data voltage; and a sensing channel configured to sample a voltage, downscale the sampled voltage to reduce the voltage, and convert the downscaled voltage to digital data using an analog-to-digital converter to output the ADC offset data, wherein the sensing channel includes:

a reference voltage generator configured to generate a first reference voltage;

a sampling circuit configured to sample and downscale the voltage;

a multiplexer connected to the output side of the sampling circuit;

an amplifier configured to receive the first reference voltage and connected between the output side of the multiplexer and the input side of an analog-to-digital converter;

a parallel-to-serial converter configured to convert the digital data output from the analog-to-digital converter into serial data; and a data transmitter configured to transmit the digital data output from the parallel-to-serial converter to the outside.

16. The display device of claim 15, wherein the sensing channel is configured to sample the voltage once, downscale the sampled voltage once, and then digitally convert the sampled voltage N times, where N is a natural number greater than or equal to 2, during a preset unit sensing time.

17. The display device of claim 15, wherein the sensing channel is configured to sample and average the voltage once, downscale the sampled voltage once, and then digitally convert the sampled voltage N times, where N is a natural number greater than or equal to 2, during a preset unit sensing time.

* * * * *